(12) United States Patent
Hatta

(10) Patent No.: US 11,254,070 B2
(45) Date of Patent: Feb. 22, 2022

(54) METHOD FOR PRODUCING HIGH-PRESSURE TANK

(71) Applicant: TOYOTA JIDOSHA KABUSHIKI KAISHA, Toyota (JP)

(72) Inventor: Ken Hatta, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 116 days.

(21) Appl. No.: 16/727,046

(22) Filed: Dec. 26, 2019

(65) Prior Publication Data

US 2020/0224823 A1 Jul. 16, 2020

(30) Foreign Application Priority Data

Jan. 16, 2019 (JP) .............................. JP2019-005514

(51) Int. Cl.
| | |
|---|---|
| *B29C 70/32* | (2006.01) |
| *B29C 70/16* | (2006.01) |
| *B29C 63/08* | (2006.01) |
| *B29C 70/86* | (2006.01) |
| *B29C 53/58* | (2006.01) |
| *B29C 53/60* | (2006.01) |
| *F17C 1/06* | (2006.01) |
| *B29C 53/84* | (2006.01) |
| *B29L 31/00* | (2006.01) |

(52) U.S. Cl.
CPC ............ *B29C 70/16* (2013.01); *B29C 53/582* (2013.01); *B29C 53/602* (2013.01); *B29C 63/08* (2013.01); *B29C 70/32* (2013.01); *B29C 70/86* (2013.01); *B29C 53/845* (2013.01); *B29L 2031/7156* (2013.01); *F17C 1/06* (2013.01); *F17C 2201/0109* (2013.01); *F17C 2203/0604* (2013.01); *F17C 2203/067* (2013.01); *F17C 2203/0621* (2013.01); *F17C 2209/2154* (2013.01)

(58) Field of Classification Search
None
See application file for complete search history.

(56) References Cited

U.S. PATENT DOCUMENTS

| | | | | |
|---|---|---|---|---|
| 2,843,153 | A | * | 7/1958 | Young ................... B29C 53/665 285/112 |
| 3,232,545 | A | * | 2/1966 | Ross ..................... B29C 53/665 242/436 |

(Continued)

FOREIGN PATENT DOCUMENTS

| | | |
|---|---|---|
| CN | 001950193 A | 4/2007 |
| JP | 2014133304 A | 7/2014 |
| JP | 2015000554 A | 1/2015 |

*Primary Examiner* — Jeffry H Aftergut
(74) *Attorney, Agent, or Firm* — Dickinson Wright, PLLC

(57) ABSTRACT

A method for producing a high-pressure tank capable of winding a reinforcing fiber bundle around a liner without deteriorating tank performance. The method for producing a high-pressure tank by winding a resin-impregnated strip-shaped reinforcing fiber bundle around a rotating liner so as to form a fiber-reinforced resin layer on the outer surface of the liner includes while winding the strip-shaped reinforcing fiber bundle around the liner, concurrently winding another bundle of fibers narrower than the strip-shaped reinforcing fiber bundle around the liner so as to cross the strip-shaped reinforcing fiber bundle.

6 Claims, 4 Drawing Sheets

(56) References Cited

U.S. PATENT DOCUMENTS

| | | | |
|---|---|---|---|
| 2003/0051795 A1* | 3/2003 | Burgess | B29C 53/68 156/169 |
| 2007/0221316 A1* | 9/2007 | Mukai | B29C 53/8016 156/169 |
| 2007/0272346 A1* | 11/2007 | Shpik | B29C 53/566 156/171 |
| 2009/0236091 A1* | 9/2009 | Hammami | B29C 53/845 166/242.1 |

* cited by examiner

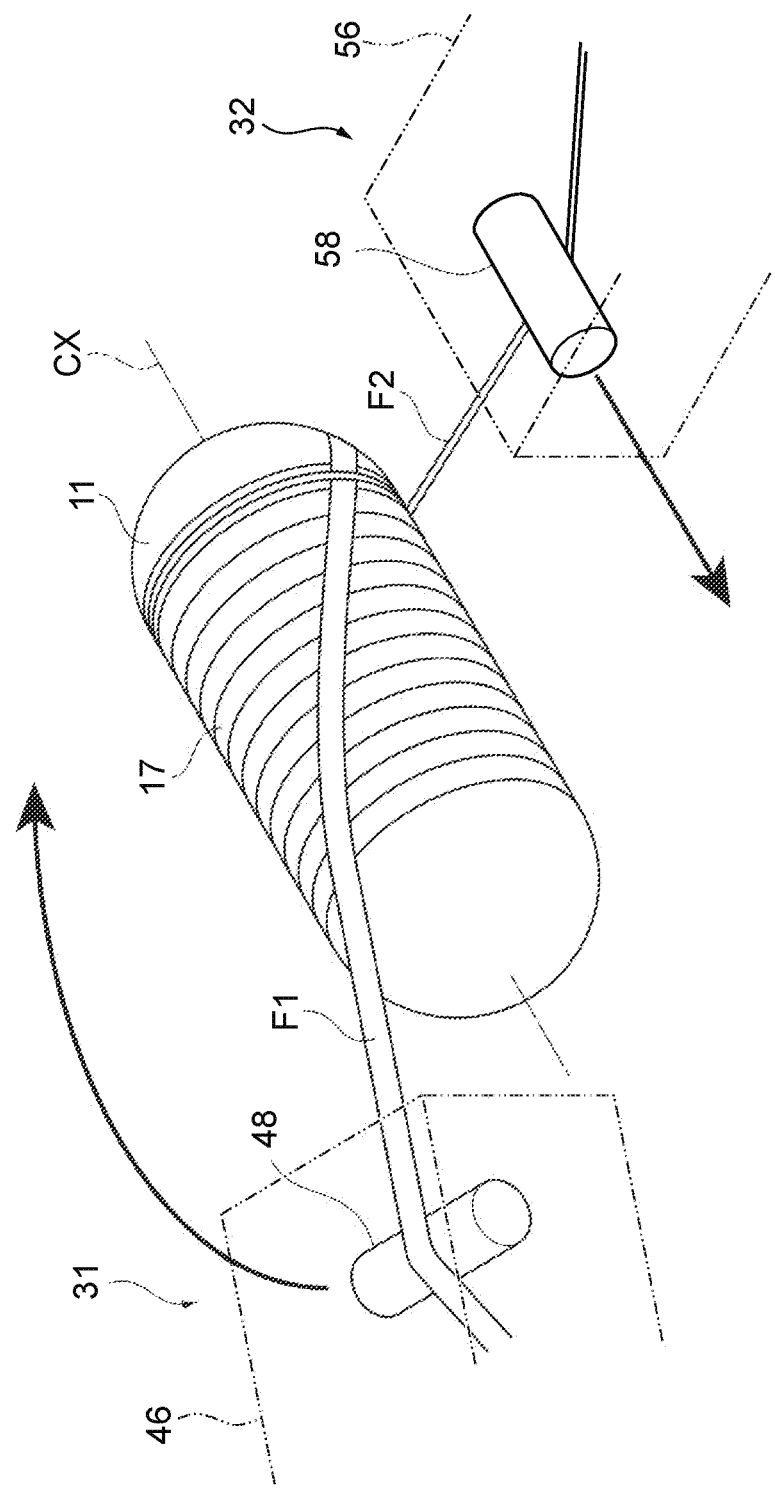

METHOD FOR PRODUCING HIGH-PRESSURE TANK

CROSS REFERENCE TO RELATED APPLICATIONS

The present application claims priority from Japanese patent application JP 2019-005514 filed on Jan. 16, 2019, the entire content of which is hereby incorporated by reference into this application.

BACKGROUND

Technical Field

The present disclosure relates to a method for producing a high-pressure tank.

Background Art

As a high-pressure tank, the one having a liner, which is to be filled with high-pressure fluid such as gas, reinforced with reinforcing fibers from the outside has been known. In a method for producing the high-pressure tank, resin-impregnated strip-shaped reinforcing fiber bundles are wound around the outer surface of the liner, using a so-called filament winding technique (hereinafter referred to as the FW technique). The FW technique, in which the reinforcing fiber bundles are wound around a rotating liner so as to form hoop layers, has a problem in that the reinforcing fiber bundles wound at end positions of the hoop layers slip from the liner. To address such a problem, a method is proposed that suppresses such slip of the reinforcing fiber bundles from the liner by increasing the number of turns of the reinforcing fiber bundles to be wound at end positions of the hoop layers (see, for example, JP 2014-133304 A).

SUMMARY

However, in the method for producing a high-pressure tank described in JP 2014-133304 A, variations in strength of the high-pressure tank may occur between portions where a greater number of turns of the fiber bundles are wound and a fewer number of turns of the fiber bundles are wound. Further, the slip of the reinforcing fiber bundles occurs not only in forming the hoop layers around the liner. Furthermore, in winding the reinforcing fiber bundles around the liner, in addition to the slip of the reinforcing fiber bundles, edge loading, in which the side ends of the reinforcing fiber bundles locally abut the liner, occurs. This is another factor of deteriorating the tank performance, such as strength and durability. To address such problems, increasing the tension of winding the reinforcing fiber bundles may be considered, but in such an approach, there are problems in that the Vf (volume fraction of fiber) increases due to leaching of resin from the reinforcing fiber bundles, thereby likely causing abrasion, breakage, and slip of the reinforcing fiber bundles as well as deterioration of the tank performance.

The present disclosure provides a method for producing a high-pressure tank that is capable of producing a high-pressure tank with stable quality as well as improved performance such as strength and durability.

In view of the foregoing, the present disclosure provides a method for producing a high-pressure tank by winding a resin-impregnated strip-shaped reinforcing fiber bundle around a rotating liner so as to form a fiber-reinforced resin layer on an outer surface of the liner, including, while winding the reinforcing fiber bundle around the liner, concurrently winding another bundle of fibers narrower than the reinforcing fiber bundle around the liner so as to cross the reinforcing fiber bundle.

According to the aforementioned method, while the reinforcing fiber bundle is wound around the liner, the other bundle of fibers is concurrently wound around the liner in such a way as to press the reinforcing fiber bundle, so that the edge loading, in which the side ends of the strip-shaped reinforcing fiber bundle abut the outer surface of the liner, can be suppressed, thereby suppressing the slip of the reinforcing fiber bundle from the outer surface of the liner. Further, since the other bundle of fibers is narrower than the reinforcing fiber bundle, even after the reinforcing fiber bundle and other bundle of fibers are wound around the liner, the state of the reinforcing fiber bundle wound around the liner will not deteriorate. Thus, a high-pressure tank with stable quality as well as improved performance such as strength and durability can be produced.

The way of winding the other bundle of fibers is not particularly limited, as long as the other bundle of fibers can be wound around the liner so as to cross the reinforcing fiber bundle. However, in some cases, the other bundle of fibers is wound around the liner while being heated. Such a way of winding can impart adhesiveness to the other bundle of fibers, thereby enabling the other bundle of fibers to firmly press the reinforcing fiber bundle.

The other bundle of fibers is not particularly limited, as long as it is narrower than the reinforcing fiber bundle. However, in some embodiments, the other bundle of fibers is a resin-impregnated reinforcing fiber bundle narrower than the strip-shaped reinforcing fiber bundle. When such a bundle of fibers is used, the narrower reinforcing fiber bundle can enhance the strength of the liner as well as press the strip-shaped reinforcing fiber bundle. Thus, the amount of the strip-shaped reinforcing fiber bundles to be wound around the liner can be reduced, so that the time for winding the strip-shaped reinforcing fiber bundles can be reduced.

The other bundle of fibers is not particularly limited, as long as it is narrower than the strip-shaped reinforcing fiber bundle. However, in some embodiments, the other bundle of fibers is compatible with the liner. When such a bundle of fibers is compatible with the liner is used, it can firmly press the strip-shaped reinforcing fiber bundle against the liner.

In some embodiments, the strip-shaped reinforcing fiber bundle and the other bundle of fibers are wound around the liner from opposite directions across the liner. Such a way of winding may inhibit entangling of the strip-shaped reinforcing fiber bundle and the other bundle of fibers while they are wound around the liner.

The way of winding is not particularly limited, as long as the strip-shaped reinforcing fiber bundle and the other bundle of fibers can be concurrently wound around the liner. However, in some embodiments, while the strip-shaped reinforcing fiber bundle is wound around the liner in a hoop, the other bundle of fibers is concurrently helically wound around the liner so as to cross the strip-shaped reinforcing fiber bundle. Such a way of winding may form hoop layers that exhibit an excellent liner reinforcing effect.

The way of winding is not particularly limited, as long as the strip-shaped reinforcing fiber bundle and the other bundle of fibers can be concurrently wound around the liner. However, in some embodiments, while the strip-shaped reinforcing fiber bundle is helically wound around the liner, the other bundle of fibers is concurrently wound around the liner in a hoop so as to cross the strip-shaped reinforcing fiber bundle. Such a way of winding may form helical layers hat exhibit an excellent liner reinforcing effect.

The way of winding is not particularly limited, as long as the other bundle of fibers that is narrower than the strip-shaped reinforcing fiber bundle can be wound around the liner so as to cross the strip-shaped reinforcing fiber bundle. However, in some embodiments, the other bundle of fibers is wound around the liner such that it forms a crossing angle in the range of 60° to 90° relative to the strip-shaped reinforcing fiber bundle wound around the liner. In such a way of winding, with the crossing angle between the strip-shaped reinforcing fiber bundle and the other bundle of fibers closer to the right angle, the other bundle of fibers can effectively suppress the slip of the strip-shaped reinforcing fiber bundle.

According to the present disclosure, while the reinforcing fiber bundle is wound around the liner, the other bundle of fibers is concurrently wound around the liner so as to press the reinforcing fiber bundle. Such a way of winding can produce a high-pressure tank with stable quality as well as improved performance such as strength and durability.

BRIEF DESCRIPTION OF THE DRAWINGS

FIG. 4 is a view of an example of a helical layer forming step according to the present embodiment.

DETAILED DESCRIPTION

Figure 1:
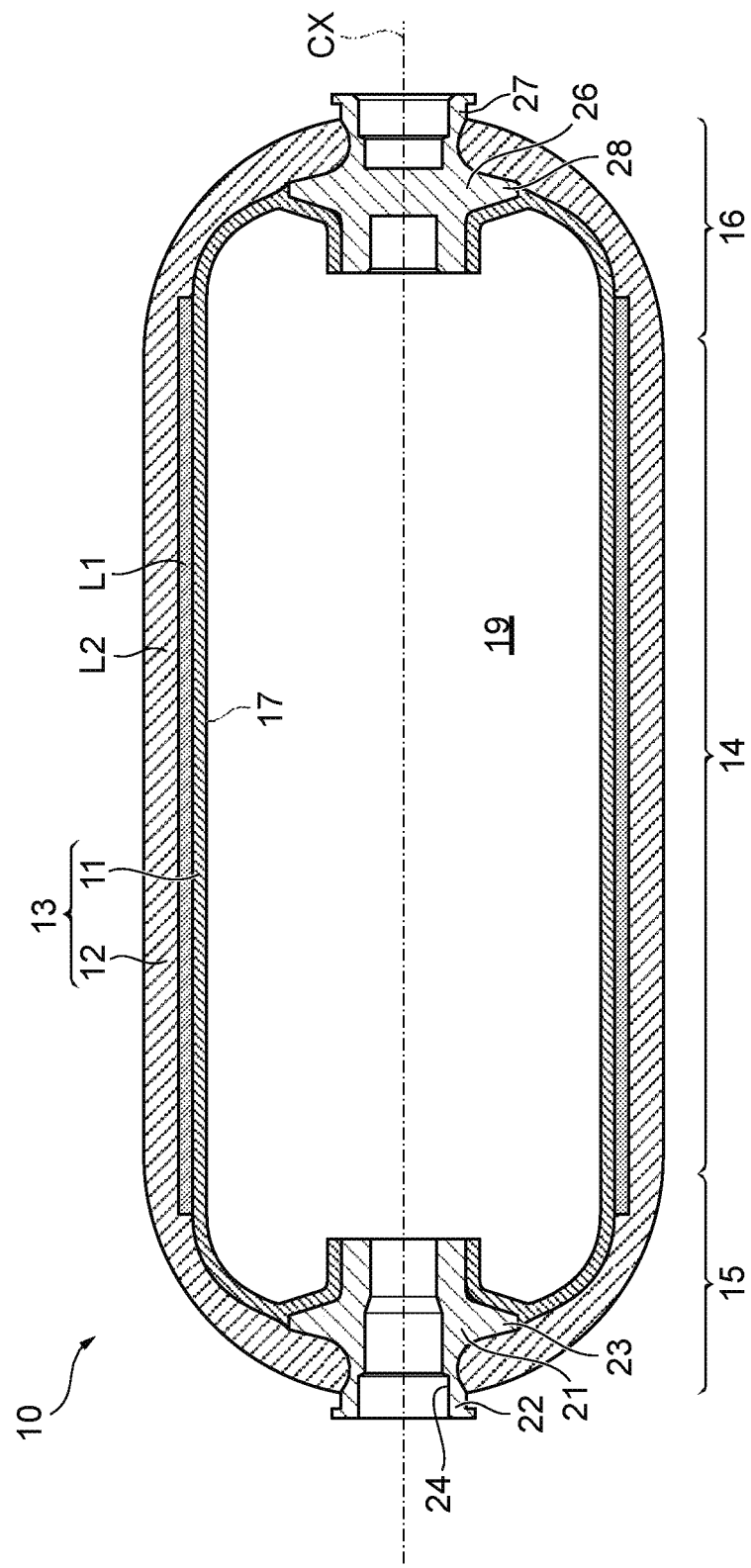
FIG. 1 is a schematic cross-sectional view of a high-pressure tank according to the present embodiment.

The present embodiment will be described below. FIG. 1 is a schematic cross-sectional view of a high-pressure tank according to a present embodiment. It should be noted that as an example of a high-pressure tank, a fuel tank that stores a fuel gas such as hydrogen for a fuel cell in an in-vehicle fuel cell system will be described below, but the high-pressure tank may be used for any purposes other than the fuel cell system.

As illustrated in FIG. 1, a high-pressure tank 10 includes a tank body 13 in which the outer surface of a liner 11, which is a substrate of the tank, is covered with a fiber-reinforced resin layer 12. The tank body 13 has an outer shape that a pair of dome portions 15 and 16 bulge outward in a semispherical form from the opposite ends of a cylindrical body portion 14. The dome portions 15 and 16 are provided, at their apexes, with mouthpieces 21 and 26 in a pair, respectively. The mouthpiece 21 on one side has formed therein a through-hole 24 with a valve (not shown) attached thereto. Through the valve, gas flows in and out of the tank body 13. The mouthpiece 26 on the other side is not provided with a through-hole, and seals the tank body 13.

The liner 11 as a substrate of the high-pressure tank 10 is formed hollow to retain a storage space 19 for a fuel gas. The liner 11 is made of resin having a gas barrier property against the fuel gas. Examples of the resin material of the liner 11 include polyamide, ethylene-vinyl alcohol copolymer, and polyethylene. Examples of the fuel gas to fill the liner 11 include various types of compressed gases, such as CNG (compressed natural gas), various types of liquefied gases, such as LNG (liquefied natural gas) and LPG (liquefied petroleum gas), and various types of other pressurized materials, in addition to a hydrogen gas. It should be noted that the liner 11 may be made of metal material, such as an aluminum alloy, in place of the resin material.

The fiber-reinforced resin layer 12 is formed such that a strip-shaped reinforcing fiber bundle impregnated with uncured resin (uncured thermosetting resin) and another bundle of fibers, which is narrower than the strip-shaped reinforcing fiber bundle, are wound around the liner 11 and heated so that the uncured resin is cured. The fiber-reinforced resin layer 12 includes a hoop layer L1 that covers a cylindrical portion 17 of the liner 11 and a helical layer L2 that entirely covers the liner 11. Although the details will be described later, in the present embodiment, the hoop layer L1 is formed such that while a reinforcing fiber bundle is wound around the liner 11 in a hoop, narrower another bundle of fibers is concurrently helically wound around the liner 11. Meanwhile, the helical layer L2 is formed such that while a reinforcing fiber bundle is helically wound around the liner 11, narrower another bundle of fibers is concurrently wound around the liner 11 in a hoop.

It should be noted that hoop winding is a winding pattern in which a reinforcing fiber bundle or another bundle of fibers is wound around the liner 11 so as to form a winding angle at which the reinforcing fiber bundle or the other bundle of fibers and the central axis CX of the liner 11 substantially orthogonally cross each other. Meanwhile, helical winding is a winding pattern in which a reinforcing fiber bundle or another bundle of fibers is wound around the liner 11 so as to form a winding angle at which the reinforcing fiber bundle or the other bundle of fibers obliquely crosses the central axis CX of the liner 11. Examples of the reinforcing fibers to be used include carbon fibers, glass fibers, and aramid fibers. Examples of the uncured resin to be used include a thermoplastic resin. When a thermoplastic resin is used for the uncured resin, a reinforcing fiber bundle with the thermoplastic resin softened is wound around the outer surface of the liner 11, and then the thermoplastic resin is cured through cooling.

The other narrower bundle of fibers to be used may be any bundle of fibers, as long as it is narrower than the strip-shaped reinforcing fiber bundle. For example, an uncured resin-impregnated narrower reinforcing fiber bundle or another bundle of fibers compatible with the liner 11 may be used. The narrower reinforcing fiber bundle may be made of reinforcing fibers and resin, which are either identical to or different from those of the strip-shaped reinforcing fiber bundle. Further, the narrower reinforcing fiber bundle may be formed such that reinforcing fibers are bundled either in a narrow strip shape or in a circular shape with a narrow width as seen in the cross section. Examples of the other bundle of fibers compatible with the liner 11 to be used include polyamide fibers (nylon fibers). When polyamide fibers are used for the other bundle of fibers, either a single polyamide fiber or narrow polyamide fibers in a bundle may be used.

Further, the width and thickness of the other narrower bundle of fibers are designed so as not to deteriorate the state of the strip-shaped reinforcing fiber bundle wound around the liner 11, when the reinforcing fiber bundle is wound around the liner 11. That is, although the other narrower bundle of fibers and strip-shaped reinforcing fiber bundle partially overlap because they are wound around the liner 11 so as to cross each other, the other bundle of fibers having a width and thickness that can prevent such overlapping portions from adversely affecting the strength and durability of the high-pressure tank 10 is used. When a reinforcing fiber bundle and polyamide fibers are used for the other bundle of fibers, the reinforcing fiber bundle and polyamide fibers are heated, so that they have sufficient adhesiveness.

The mouthpiece 21 on one side is made of metal, such as aluminum or an aluminum alloy. The mouthpiece 21 on one side is attached to the liner 11 such that a flange 23 is formed on the outer periphery of a cylindrical portion 22 that forms a body, and a portion of the cylindrical portion 22 projects from the dome portion 15. The through-hole 24 inside the cylindrical portion 22 has attached thereto a valve (not shown) that allows a fuel gas to fill the storage space 19 and be discharged therefrom. The mouthpiece 26 on the other side is made of metal such as aluminum or an aluminum alloy. The mouthpiece 26 on the other side has an outer shape that is substantially the same as that of the mouthpiece 21 on one side, but is different from the mouthpiece 21 on one side in that the inner side of a cylindrical portion 27 of the mouthpiece 26 is closed.

Figure 2:
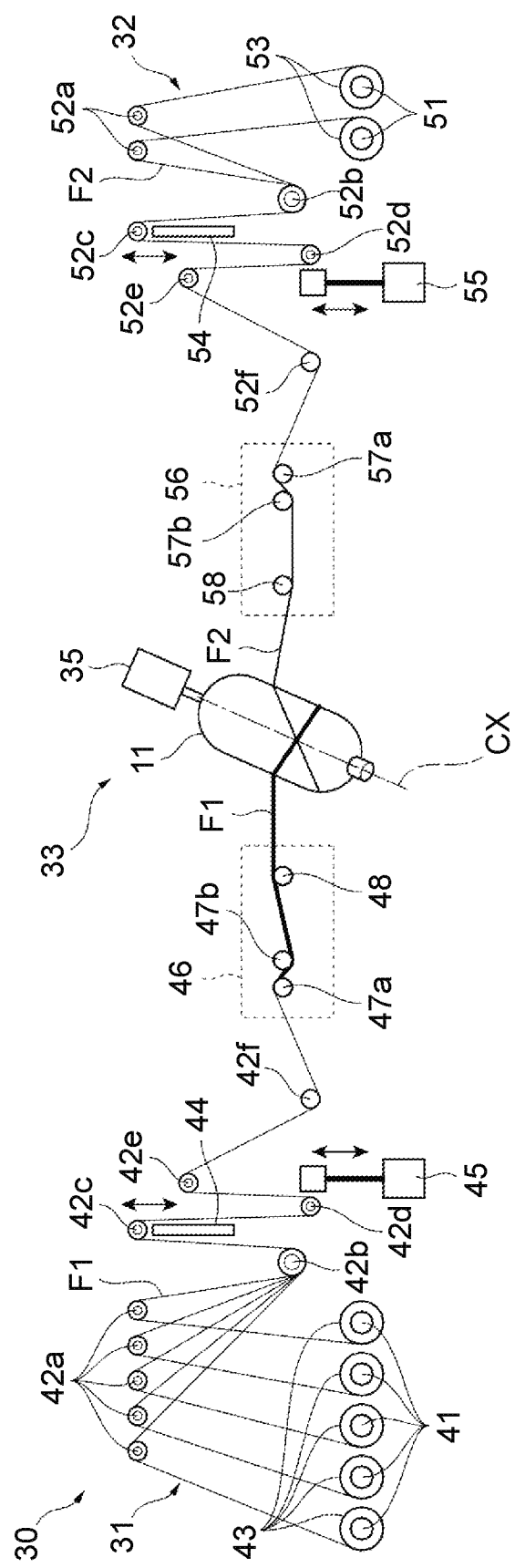
FIG. 2 is a schematic diagram of a winding unit for a reinforcing fiber bundle according to the present embodiment.

With reference to FIG. 2, a winding unit for winding the reinforcing fiber bundle will be described. FIG. 2 is a schematic diagram of the winding unit for the reinforcing fiber bundle according to the present embodiment. It should be noted that FIG. 2 shows an example in which a narrower reinforcing fiber bundle is used as the other bundle of fibers.

As shown in FIG. 2, a winding unit 30 includes a first feeding unit 31 that feeds a strip-shaped reinforcing fiber bundle F1 to the liner 11, a second feeding unit 32 that feeds a narrower reinforcing fiber bundle F2 to the liner 11, and a rotating mechanism 33 that rotates the liner 11 so as to reel the reinforcing fiber bundles F1 and F2. The first and second feeding units 31 and 32 are disposed so as to face each other across the rotating mechanism 33, and the directions of feeding the reinforcing fiber bundle F1 and reinforcing fiber bundle F2 to the liner 11 are opposite to each other. In the winding unit 30, while the reinforcing fiber bundle F1 is wound around the liner 11, the reinforcing fiber bundle F2 is concurrently wound around the liner 11.

The first feeding unit 31 includes a plurality of unreeling shafts 41, a plurality of feeding rollers 42a to 42f, and a guide unit 46. The plurality of unreeling shafts 41, plurality of feeding rollers 42a to 42f, and guide unit 46 form a feeding path leading to the liner 11 for the reinforcing fiber bundles F1 from bobbins 43 set in the unreeling shafts 41. The resin-impregnated reinforcing fiber bundles F1 (prepregs) are wound around the bobbins 43 in advance. The reinforcing fiber bundles F1 reeled from the bobbins 43 are gathered at the feeding roller 42b via the feeding rollers 42a, have their tensions adjusted at the feeding rollers 42c and 42d, and are then sent to the guide unit 46 via the feeding rollers 42e and 42f.

The feeding roller 42c, which is a so-called tension roller, is coupled to a tension adjusting mechanism 44. The tension adjusting mechanism 44 moves the feeding roller 42c to adjust the tension with which the reinforcing fiber bundle F1 is wound around the liner 11. The feeding roller 42d, which is a so-called dancer roller, is coupled to an active dancer controller 45. The active dancer controller 45 moves the feeding roller 42d to adjust the distance between the feeding rollers 42d and 42e. In this manner, even when the winding of the reinforcing fiber bundle F1 is suspended or the winding speed has changed, the tension of the reinforcing fiber bundle F1 is maintained constant.

The guide unit 46 has a guiding mechanism to guide the reinforcing fiber bundle F1 to the liner 11. The guide unit 46 is provided with a pair of widening rollers 47a and 47b and a sending roller 48. The pair of widening rollers 47a and 47b widen the plurality of reinforcing fiber bundles F1 while sandwiching them therebetween, so that one strip-shaped reinforcing fiber bundle F1 is formed, and the sending roller 48 sends the strip-shaped reinforcing fiber bundle F1 that has passed through the widening rollers 47a and 47b to the liner 11. The guide unit 46 reciprocates in the axial direction of the liner 11 by means of an actuator (not shown). Further, the winding pattern of the reinforcing fiber bundle F1 may be changed by changing the reciprocating path of the guide unit 46 and the rotational speed of the liner 11, for example.

The second feeding unit 32 includes a plurality of unreeling shafts 51, a plurality of feeding rollers 52a to 52f, and a guide unit 56. The feeding roller 52c is coupled to a tension adjusting mechanism 54 and the feeding roller 52d is coupled to an active dancer controller 55. The guide unit 56 is provided with a pair of widening rollers 57a and 57b and a sending roller 58. Since the number of bobbins 53 of the second feeding unit 32 is smaller than that of the bobbins 43 of the first feeding unit 31, the reinforcing fiber bundle F2 that is narrower than the reinforcing fiber bundle F1 is sent out from the second feeding unit 32. The configurations of the components of the second feeding unit 32 are the same as those of the first feeding unit 31, except for the sending roller 58 of the guide unit 56, and thus, their overlapping explanations are omitted.

The sending roller 58 of the guide unit 56 has a built-in heating mechanism (not shown) for heating the narrower reinforcing fiber bundle F2. Thus, when passing through the sending roller 58, the narrower reinforcing fiber bundle F2 is heated by the sending roller 58, so that its adhesiveness is increased. It should be noted that the heating mechanism only needs to be capable of heating another bundle of fibers such as the narrower reinforcing fiber bundle F2 passing through the guide unit 56. The heating mechanism may be built in either the pair of widening rollers 57a and 57b or the sending roller 58, or in each of the pair of widening rollers 57a and 57b and the sending roller 58.

The rotating mechanism 33 rotationally supports the liner 11. The rotating mechanism 33 is provided with a motor 35, by which the liner 11 is rotated about the central axis CX. As the liner 11 is rotated, the strip-shaped reinforcing fiber bundle F1 is reeled from the first feeding unit 31, and the narrower reinforcing fiber bundle F2 is also concurrently reeled from the second feeding unit 32. The strip-shaped reinforcing fiber bundle F1 and narrower reinforcing fiber bundle F2 are wound around the liner 11 so as to cross each other, so that the strip-shaped reinforcing fiber bundle F1 is pressed against the liner 11 by the adhesive narrower reinforcing fiber bundle F2. Thus, the slip of the strip-shaped reinforcing fiber bundle F1 from the liner 11 and its edge loading against the liner 11 can be prevented, for example.

At this time, the strip-shaped reinforcing fiber bundle F1 fed from the first feeding unit 31 and the narrower reinforcing fiber bundle F2 fed from the second feeding unit 32 are wound around the liner 11 in different winding patterns. For example, when the strip-shaped reinforcing fiber bundle F1 is wound around the liner 11 in a hoop, the narrower reinforcing fiber bundle F2 is helically wound around the liner 11. Meanwhile, when the strip-shaped reinforcing fiber bundle F1 is helically wound around the liner 11, the narrower reinforcing fiber bundle F2 is wound around the liner 11 in a hoop. Thus, the strip-shaped reinforcing fiber bundle F1 and the narrower reinforcing fiber bundle F2 are wound around the liner 11 in different winding directions, and thus are allowed to cross each other.

Figure 3:
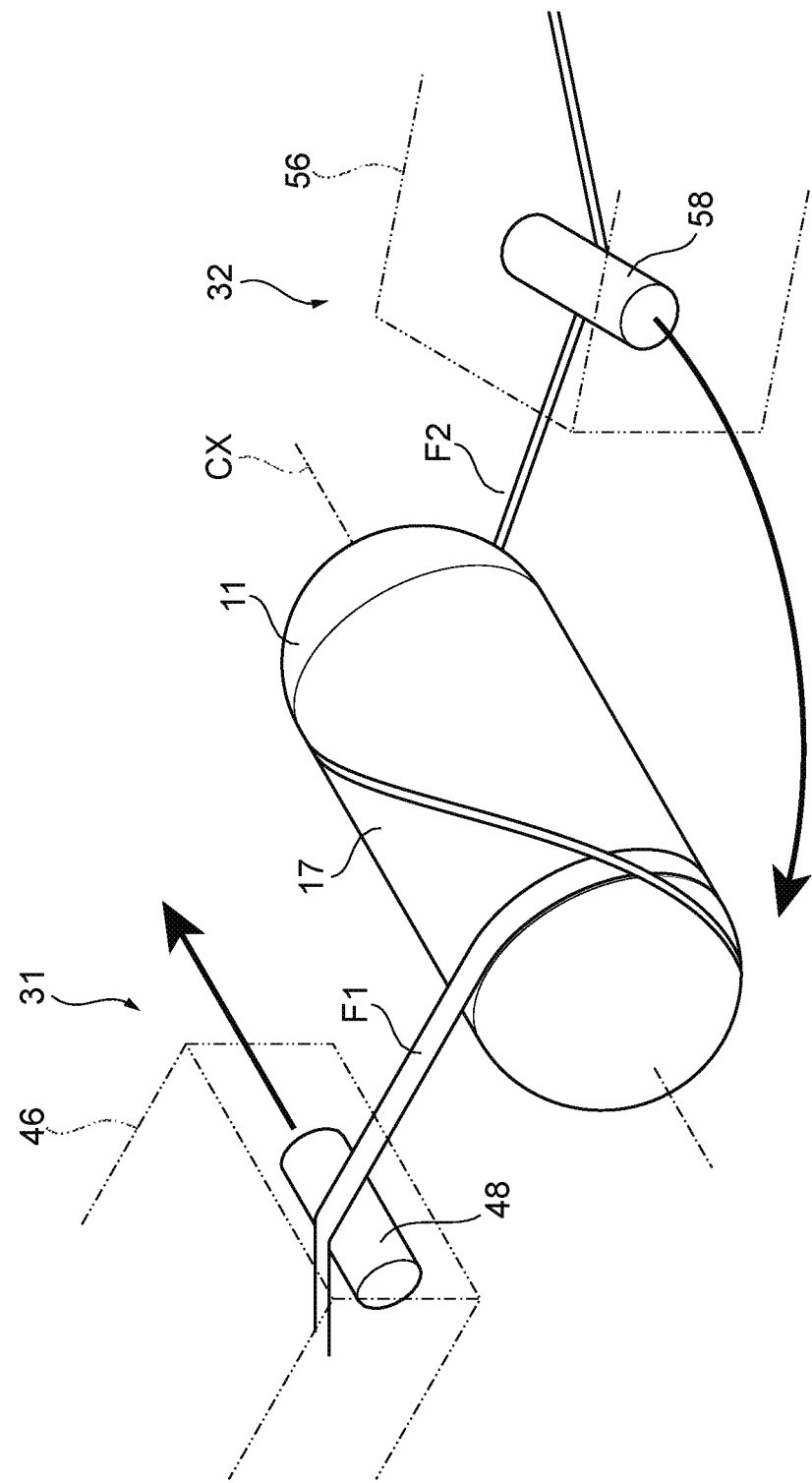
FIG. 3 is a view of an example of a hoop layer forming step according to the present embodiment.

With reference to FIG. 3 and FIG. 4, a hoop layer forming step and a helical layer forming step will be described below. FIG. 3 is a view of an example of a hoop layer forming step according to the present embodiment. FIG. 4 is a view of an example of a helical layer forming step according to the present embodiment. It should be noted that in FIG. 4, the illustration of the helical layer is simplified for convenience.

As shown in FIG. 3, in the step of forming the hoop layer L1 (see FIG. 1), while the strip-shaped reinforcing fiber bundle F1 is wound around the liner 11 in a hoop, the narrower reinforcing fiber bundle F2 is helically wound around the liner 11. The guide unit 46 of the first feeding unit 31 and the guide unit 56 of the second feeding unit 32 are positioned on the opposite sides across the liner 11, and while the strip-shaped reinforcing fiber bundle F1 is fed from the first feeding unit 31 to the liner 11, the narrower reinforcing fiber bundle F2 is fed from the second feeding unit 32 to the liner 11. Since the strip-shaped reinforcing fiber bundle F1 and the narrower reinforcing fiber bundle F2 are wound around the liner 11 from the opposite directions, the strip-shaped reinforcing fiber bundle F1 and the narrower reinforcing fiber bundle F2 can be prevented from getting entangled with each other.

As the liner 11 is rotated about the central axis CX, the strip-shaped reinforcing fiber bundle F1 fed from the first feeding unit 31 is wound around the liner 11 so as to form a winding angle at which the strip-shaped reinforcing fiber bundle F1 and the central axis CX substantially orthogonally cross each other, and the narrower reinforcing fiber bundle F2 fed from the second feeding unit 32 is wound around the liner 11 so as to form a winding angle at which the narrower reinforcing fiber bundle F2 obliquely crosses the central axis CX. As the guide unit 46 reciprocates along the central axis CX of the liner 11, the strip-shaped reinforcing fiber bundle F1 is wound in a hoop around the cylindrical portion 17 of the liner 11. Concurrently, on the other side of the guide unit 46 across the liner 11, as the guide unit 56 reciprocates between the opposite ends in the central axis direction of the liner 11 so as to draw an arc shape, the narrower reinforcing fiber bundle F2 is helically wound around the liner 11.

More specifically, the strip-shaped reinforcing fiber bundle F1 is wound around the cylindrical portion 17 of the liner 11, while the position of winding the strip-shaped reinforcing fiber bundle F1 is being shifted in the axial direction, and concurrently, the narrower reinforcing fiber bundle F2 is wound around the liner 11 so as to cross the strip-shaped reinforcing fiber bundle F1. While the position of winding the strip-shaped reinforcing fiber bundle F1 around the cylindrical portion 17 of the liner 11 is shifted by one pitch (or by the width of the reinforcing fiber bundle F1) in the axial direction, the narrower reinforcing fiber bundle F2 is wound around the liner 11. By repeating such winding of the strip-shaped reinforcing fiber bundle F1 and narrower reinforcing fiber bundle F2 around the liner 11, the strip-shaped reinforcing fiber bundle F1 can be wound around the liner 11 while being pressed by the narrower reinforcing fiber bundle F2.

In this manner, the strip-shaped reinforcing fiber bundle F1 is wound around the cylindrical portion 17 of the liner 11 in a hoop, and the narrower reinforcing fiber bundle F2 is helically wound so as to press the strip-shaped reinforcing fiber bundle F1. Even when edge loading, in which the side ends of the strip-shaped reinforcing fiber bundle F1 locally abut the liner 11, occurs, the strip-shaped reinforcing fiber bundle F1 is pressed by the narrower reinforcing fiber bundle F2 such that its surface to be wound entirely abuts the outer surface of the liner 11. Further, since the narrower reinforcing fiber bundle F2 is heated by the sending roller 58, the adhesiveness of the narrower reinforcing fiber bundle F2 is increased, so that the slip of the strip-shaped reinforcing fiber bundle F1 from the liner 11 can be prevented.

While the strip-shaped reinforcing fiber bundle F1 is wound around the liner 11 in a hoop, the narrower reinforcing fiber bundle F2 is concurrently helically wound around the liner 11 so as to cross the strip-shaped reinforcing fiber bundle F1, so that the hoop layer L1 is formed on the cylindrical portion 17 of the liner 11. Since the strip-shaped reinforcing fiber bundle F1 is wound around the cylindrical portion 17 in the axial direction of the liner 11 without leaving unwound portions and the narrower reinforcing fiber bundle F2 is concurrently helically wound around the outer surface of the liner 11, the effect of reinforcing the liner 11 with the hoop layer L1 is improved. Thus, the number of stacked layers of the hoop layer L1 can be reduced to the extent equivalent to the degree of the improvement in the reinforcing effect obtained with the hoop layer L1, so that the time for winding the strip-shaped reinforcing fiber bundle F1 can be reduced.

As shown in FIG. 4, in the step of forming the helical layer L2 (see FIG. 1), the strip-shaped reinforcing fiber bundle F1 is helically wound around the liner 11, and the narrower reinforcing fiber bundle F2 is wound around the liner 11 in a hoop. In this case, by changing the reciprocating paths of the guide units 46 and 56 and the rotational speed of the liner 11, the pattern of winding the strip-shaped reinforcing fiber bundle F1 is switched from hoop winding to helical winding, and the pattern of winding the narrower reinforcing fiber bundle F2 is switched from helical winding to hoop winding. Also in the step of forming the helical layer L2, since the strip-shaped reinforcing fiber bundle F1 and narrower reinforcing fiber bundle F2 are wound around the liner 11 from the opposite directions, the strip-shaped reinforcing fiber bundle F1 and the narrower reinforcing fiber bundle F2 can be prevented from getting entangled with each other.

As the liner 11 is rotated about the central axis CX, the strip-shaped reinforcing fiber bundle F1 fed from the first feeding unit 31 is wound around the liner 11 so as to form a winding angle at which the strip-shaped reinforcing fiber bundle F1 obliquely crosses the central axis CX, and the narrower reinforcing fiber bundle F2 fed from the second feeding unit 32 is wound around the liner 11 so as to form a winding angle at which the narrower reinforcing fiber bundle F2 and the central axis CX substantially orthogonally cross each other. As the guide unit 46 reciprocates between the opposite ends in the central axis direction of the liner 11 so as to draw an arc shape, the strip-shaped reinforcing fiber bundle F1 is helically wound around the liner 11. On the other side of the guide unit 46 across the liner 11, as the guide unit 56 reciprocates along the central axis CX of the liner 11, the narrower reinforcing fiber bundle F2 is wound in a hoop around the cylindrical portion 17 of the liner 11.

More specifically, the strip-shaped reinforcing fiber bundle F1 is wound around the liner 11 with its position and angle of winding being changed, and concurrently, the narrower reinforcing fiber bundle F2 is wound around the liner 11 so as to cross the strip-shaped reinforcing fiber bundle F1. While the strip-shaped reinforcing fiber bundle F1 is being wound by one turn around the liner 11, the narrower reinforcing fiber bundle F2 is wound around the liner 11. By repeating such winding of the strip-shaped reinforcing fiber bundle F1 and the narrower reinforcing fiber bundle F2 around the liner 11, the strip-shaped reinforcing fiber bundle F1 can be wound around the liner 11 while being pressed by the narrower reinforcing fiber bundle F2.

In this manner, the strip-shaped reinforcing fiber bundle F1 is helically wound around the entire liner 11, and the narrower reinforcing fiber bundle F2 is wound in a hoop so as to press the strip-shaped reinforcing fiber bundle F1. Even when edge loading, in which the side ends of the strip-shaped reinforcing fiber bundle F1 locally abut the liner 11, occurs, the strip-shaped reinforcing fiber bundle F1 is pressed by the narrower reinforcing fiber bundle F2 such that its surface to be wound entirely abuts the outer surface of the liner 11. Further, since the narrower reinforcing fiber bundle F2 is heated by the sending roller 58, the adhesiveness of the narrower reinforcing fiber bundle F2 is increased, so that the slip of the strip-shaped reinforcing fiber bundle F1 from the liner 11 can be prevented.

While the strip-shaped reinforcing fiber bundle F1 is helically wound around the liner 11, the narrower reinforcing fiber bundle F2 is concurrently wound around the liner 11 in a hoop so as to cross the strip-shaped reinforcing fiber bundle F1, so that the helical layer L2 is formed so as to entirely cover the liner 11. Since the strip-shaped reinforcing fiber bundle F1 is wound around the entire outer surface of the liner 11 without leaving unwound portions and the narrower reinforcing fiber bundle F2 is concurrently wound around the cylindrical portion 17 of the liner 11 in a hoop, the effect of reinforcing the liner 11 with the helical layer L2 is improved. Thus, the number of stacked layers of the hoop layer L2 can be reduced to the extent equivalent to the degree of the improvement in the reinforcing effect obtained with the hoop layer L2, so that the time for winding the strip-shaped reinforcing fiber bundle F1 can be reduced.

Once the hoop layer 1 and helical layer L2 are formed on the outer surface of the liner 11, the uncured resin with which the reinforcing fiber bundle F1 is impregnated is cured in a curing furnace, so that the fiber-reinforced resin layer 12 is formed on the outer surface of the liner 11. The strip-shaped reinforcing fiber bundle F1 and narrower reinforcing fiber bundle F2 overlap with each other in the hoop layer L1 and helical layer L2, but since the width and thickness of the narrower reinforcing fiber bundle F2 are smaller than those of the strip-shaped reinforcing fiber bundle F1, the performance, such as the strength, of the fiber-reinforced resin layer 12 is not deteriorated. In the present embodiment, the narrower reinforcing fiber bundle F2 is used for the other bundle of fibers, but when polyamide fibers compatible with the liner 11 are used for the other bundle of fibers, the same results can be obtained.

Further, in the present embodiment, hoop winding and helical winding of the bundles around the liner 11 are concurrently performed, but the winding only needs to be performed such that the strip-shaped reinforcing fiber bundle F1 and narrower reinforcing fiber bundle F2 are wound around the liner 11 so as to cross each other. For example, helical winding with different winding angles, which include larger and smaller angles, may concurrently be performed. The way of helical winding with a larger angle forms a crossing angle (winding angle) in the range of, for example, 70° to 80° relative to the central axis CX, while the way of helical winding with a smaller angle forms a crossing angle in the range of, for example, 5° to 30° relative to the central axis CX.

Further, the crossing angle between the strip-shaped reinforcing fiber bundle F1 and the narrower reinforcing fiber bundle F2 to be wound around the liner 11 is not particularly limited, but in some cases, the narrower reinforcing fiber bundle F2 is wound around the liner 11 so as to form a crossing angle in the range of 60° to 90° relative to the strip-shaped reinforcing fiber bundle F1 wound around the liner 11. With the crossing angle between the strip-shaped reinforcing fiber bundle F1 and narrower reinforcing fiber bundle F2 closer to the right angle, the narrower reinforcing fiber bundle F2 can effectively suppress the slip of the strip-shaped reinforcing fiber bundle F1. In addition, the narrower reinforcing fiber bundle F2 may be wound around the liner 11 without leaving unwound portions or maintaining given spaces between the turns of the bundle.

As described above, in the method for producing a high-pressure tank of the present embodiment, while the strip-shaped reinforcing fiber bundle F1 is wound around the liner 11, the narrower reinforcing fiber bundle F2 is concurrently wound around the liner 11 so as to press the strip-shaped reinforcing fiber bundle F1. This can suppress the edge loading of the side ends of the strip-shaped reinforcing fiber bundle F1 against the outer surface of the liner 11, so that the slip of the strip-shaped reinforcing fiber bundle F1 from the outer surface of the liner 11 can be suppressed. In addition, since the reinforcing fiber bundle F2 is narrower than the strip-shaped reinforcing fiber bundle F1, even after the strip-shaped reinforcing fiber bundle F1 and narrower reinforcing fiber bundle F2 are wound around the liner 11, the state of the strip-shaped reinforcing fiber bundle F1 wound around the liner 11 will not deteriorate. Therefore, a high-pressure tank 10 with stable quality as well as improved performance such as strength and durability can be produced.

It should be noted that in the present embodiment, the other bundle of fibers such as the narrower reinforcing fiber bundle F2 is wound around the liner 11, while being heated, but the way of winding is not limited thereto. The other bundle of fibers need not be heated if it has adhesiveness at room temperature or is capable of sufficiently pressing the strip-shaped reinforcing fiber bundle F1 without being heated.

Further, in the present embodiment, the strip-shaped reinforcing fiber bundle F1 and narrower reinforcing fiber bundle F2 are wound around the liner 11 from the opposite directions across the liner 11, but the way of winding is not limited thereto. The strip-shaped reinforcing fiber bundle F1 and the other bundle of fibers such as the narrower reinforcing fiber bundle F2 may be wound around the liner 11 from the same direction, if they do not get entangled with each other.

Furthermore, in the present embodiment, while the strip-shaped reinforcing fiber bundle F1 is being wound by one turn around the liner 11, the narrower reinforcing fiber bundle F2 may be wound by one turn around the liner 11, or while the strip-shaped reinforcing fiber bundle F1 are being wound by multiple turns around the liner 11, the narrower reinforcing fiber bundle F2 may be wound by one turn around the liner 11.

Although the present embodiment has been described, another embodiment that combines all or part of the present embodiment with a modification may also be available. Further, the technique of the present disclosure is not limited to the present embodiment, and may be changed, replaced with other ones, or modified in various ways within the spirit and scope of the technical idea of the present disclosure. In addition, as long as the technical idea can be realized, any other methods using advanced techniques or other derivative techniques may also be adopted. Accordingly, the claims encompass all of embodiments that are within the spirit and scope of the technical idea.

What is claimed is:

1. A method for producing a high-pressure tank by winding a resin-impregnated strip-shaped reinforcing fiber bundle around a rotating liner so as to form a fiber-reinforced resin layer including a hoop layer that covers an outer surface of the liner and a helical layer that covers an outer surface of the hoop layer, comprising:
  while winding the reinforcing fiber bundle around the liner in a hoop, concurrently helically winding another bundle of fibers narrower than the reinforcing fiber bundle around the liner so as to cross the reinforcing fiber bundle, thereby forming the hoop layer, and
  while helically winding the reinforcing fiber bundle around the hoop layer, concurrently winding the other bundle of fibers narrower than the reinforcing fiber bundle around the hoop layer in a hoop so as to cross the reinforcing fiber bundle, thereby forming the helical layer;
  wherein while the strip-shaped reinforcing fiber bundle is wound around the liner in a hoop, the other narrower bundle of fibers are concurrently helically wound around the liner so as to cross the strip-shaped reinforcing fiber bundle; and
  wherein while the strip-shaped reinforcing fiber bundle is helically wound around the hoop layer, the other narrower bundle of fibers are concurrently wound around the hoop layer in a hoop so as to cross the strip-shaped reinforcing fiber bundle.

2. The method for producing a high-pressure tank according to claim 1, wherein the other narrower bundles of fibers are wound around the liner or the hoop layer while being heated.

3. The method for producing a high-pressure tank according to claim 1, wherein the other narrower bundles of fibers are a resin-impregnated reinforcing fiber bundle narrower than the strip-shaped reinforcing fiber bundle.

4. The method for producing a high-pressure tank according to claim 1, wherein the other narrower bundles of fibers are compatible with the liner.

5. The method for producing a high-pressure tank according to claim 1, wherein the strip-shaped reinforcing fiber bundle and the other narrower bundles of fibers are wound around the liner or the hoop layer from opposite directions across the liner.

6. The method for producing a high-pressure tank according to claim 1, wherein the other narrower bundles of fibers are wound around the liner or the hoop layer such that they form a crossing angle in a range of 60° to 90° relative to the strip-shaped reinforcing fiber bundle wound around the liner or the hoop layer.

* * * * *